(12) United States Patent
Boland et al.

(10) Patent No.: US 7,151,923 B2
(45) Date of Patent: Dec. 19, 2006

(54) SYSTEMS FOR PROVIDING MESSAGE WAITING NOTIFICATION UPDATES IN A CELLULAR COMMUNICATION NETWORK

(75) Inventors: Richard Robert Boland, LaGrange, IL (US); Mark Alan McCormick, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 413 days.

(21) Appl. No.: 10/610,174

(22) Filed: Jun. 30, 2003

(65) Prior Publication Data

US 2004/0266403 A1 Dec. 30, 2004

(51) Int. Cl.
*H04M 1/663* (2006.01)

(52) U.S. Cl. .............. 455/412.2; 455/435.1; 455/432.1; 455/433; 455/436; 455/466; 340/7.22

(58) Field of Classification Search .......... 455/432.3, 455/433, 435.1, 437, 412.1; 340/7.22
See application file for complete search history.

(56) References Cited

U.S. PATENT DOCUMENTS

| | | | |
|---|---|---|---|
| 5,664,009 A | | 9/1997 | Hurst et al. |
| 5,797,094 A | | 8/1998 | Houde et al. |
| 6,014,559 A | * | 1/2000 | Amin ................ 455/413 |
| 6,032,043 A | * | 2/2000 | Houde ............... 455/433 |
| 6,055,423 A | * | 4/2000 | Calabrese et al. ....... 455/412.2 |
| 6,073,015 A | * | 6/2000 | Berggren et al. ....... 455/432.2 |
| 6,178,322 B1 | * | 1/2001 | Creech ................ 455/412.2 |
| 6,282,416 B1 | * | 8/2001 | Verdonk ............... 455/413 |
| 6,285,880 B1 | * | 9/2001 | Gagnon et al. ......... 455/432.1 |
| 6,333,973 B1 | * | 12/2001 | Smith et al. .......... 379/88.12 |
| 6,453,164 B1 | | 9/2002 | Fuller et al. |
| 6,751,456 B1 | | 6/2004 | Bilgic |
| 6,775,255 B1 | * | 8/2004 | Roy .................... 370/331 |
| 2002/0006782 A1 | * | 1/2002 | Kim ..................... 455/412 |
| 2002/0101964 A1 | * | 8/2002 | Contractor ............. 379/88.25 |
| 2002/0137500 A1 | * | 9/2002 | Brooking et al. ....... 455/419 |
| 2003/0224789 A1 | * | 12/2003 | Adamany et al. ........ 455/435.1 |
| 2004/0203763 A1 | * | 10/2004 | Tammi .................. 455/435.1 |
| 2004/0224706 A1 | | 11/2004 | Lorello et al. |
| 2005/0107086 A1 | * | 5/2005 | Tell et al. ............. 455/445 |

\* cited by examiner

*Primary Examiner*—Nick Corsaro
*Assistant Examiner*—Diego Herrera

(57) ABSTRACT

The message waiting notification update system is operable in the serving Mobile Switching Center and, upon receipt of a message-waiting acknowledgement from the mobile subscriber station, updates the local copy of the subscriber's data in the Visited Location Register and forwards this information to the subscriber's Home Location Register. The Home Location Register stores this received data for use when the next successive Registration Notification is received from a new serving Mobile Switching Center or in response to the subscriber initiating a local access. When the serving Mobile Switching Center receives a Registration Notification message return result from the subscriber's Home Location Register and the message waiting notification count is the same as the count previously sent to the Home Location Register, the serving Mobile Switching Center does not have to transmit a message waiting notification over the forward control channel to the mobile subscriber station.

17 Claims, 7 Drawing Sheets

TO STEP 309 ON FIG. 3B

SYSTEMS FOR PROVIDING MESSAGE WAITING NOTIFICATION UPDATES IN A CELLULAR COMMUNICATION NETWORK

FIELD OF THE INVENTION

This invention relates to cellular communication networks and in particular to a system that provides message waiting notification update messages to mobile subscriber stations that roam among a number of Mobile Switching Centers within the cellular communication network.

Problem

A problem with the present Message Waiting Notification service in cellular communication networks is that it is difficult to efficiently utilize the network resources when the mobile subscriber station roams among various call coverage areas. In particular, when a mobile subscriber station registers with a visited (serving) Mobile Switching Center, the subscriber's Home Location Register (HLR) transmits information to the serving Mobile Switching Center indicative of the number of messages waiting for retrieval by the subscriber at the mobile subscriber station. The serving Mobile Switching Center uses the forward control (paging) channel to transmit this message waiting data to the mobile subscriber station. The mobile subscriber station acknowledges receipt of the message received on the forward control channel and the presence of the unread message waiting information. The Visited Location Register in the serving Mobile Switching Center is updated to indicate that the mobile subscriber station has been notified about the presence of unread messages.

When the mobile subscriber station roams to the call coverage area of another Mobile Switching Center and performs either an autonomous registration or a call origination/termination, the new serving Mobile Switching Center accesses the subscriber's Home Location Register to obtain subscriber information to authorize the provision of service to this subscriber. As part of this process, the subscriber's Home Location Register again transmits the message waiting information, indicative of the number of messages waiting for retrieval by the subscriber at the mobile subscriber station, to the new serving Mobile Switching Center. The new serving Mobile Switching Center is unaware of the previous message exchange noted above and uses the forward control (paging) channel to again transmit this data to the mobile subscriber station. The mobile subscriber station acknowledges receipt of the message received on the forward control channel and the presence of the unread message waiting information. The Visited Location Register in the new serving Mobile Switching Center is updated to indicate that the mobile subscriber station has been notified about the presence of unread messages.

This process can continue seriatim as the subscriber roams through various call coverage areas, since each Mobile Switching Center is unaware of the acknowledgement transmitted by the mobile subscriber station to the original Mobile Switching Center and any other previously contacted Mobile Switching Centers. In a highly congested cellular communication network or a cellular communication network with many border cells, the number of forward control channel message transmissions becomes excessive and serves to congest the forward control channel with unnecessary messages. Ultimately, the forward control channel congestion can result in the loss of new call originations and call deliveries.

Solution

The above-described problems are solved and a technical advance achieved by the present system for providing message waiting notification updates in a cellular communication network (termed "message waiting notification update system" herein) which maintains an accurate count of the number of unread messages waiting for a subscriber and the number of unread messages acknowledged by the mobile subscriber station. The message waiting notification update system comprises a number of processes that execute in the various Mobile Switching Centers of the cellular communication network and functions to create a new parameter to enable the exchange of this information between the Home Location Register and the serving Mobile Switching Center. In particular, the serving Mobile Switching Center, upon receipt of a message waiting acknowledgement from the mobile subscriber station, updates the local copy of the subscriber's data in the Visited Location Register and forwards this information to the subscriber's Home Location Register via a message, such as an ANSI-41 Registration Notification return result, with the qualification information code being set to NO INFO (or Registration Cancellation return result) and the number of the messages in the message waiting queue being acknowledged. The Home Location Register stores this received data in the subscriber's Home Location Register entry for use when the next successive Registration Notification is received from a new serving Mobile Switching Center or in response to the subscriber initiating a local access.

When the serving Mobile Switching Center receives a Registration Notification message return result from the subscriber's Home Location Register to update the subscriber's information and the message waiting notification count is the same as the count previously sent to the Home Location Register, the serving Mobile Switching Center does not have to transmit a message waiting notification over the forward control channel to the mobile subscriber station, thus reducing the message traffic on the forward control channel.

DETAILED DESCRIPTION OF THE DRAWINGS

Figure 1:
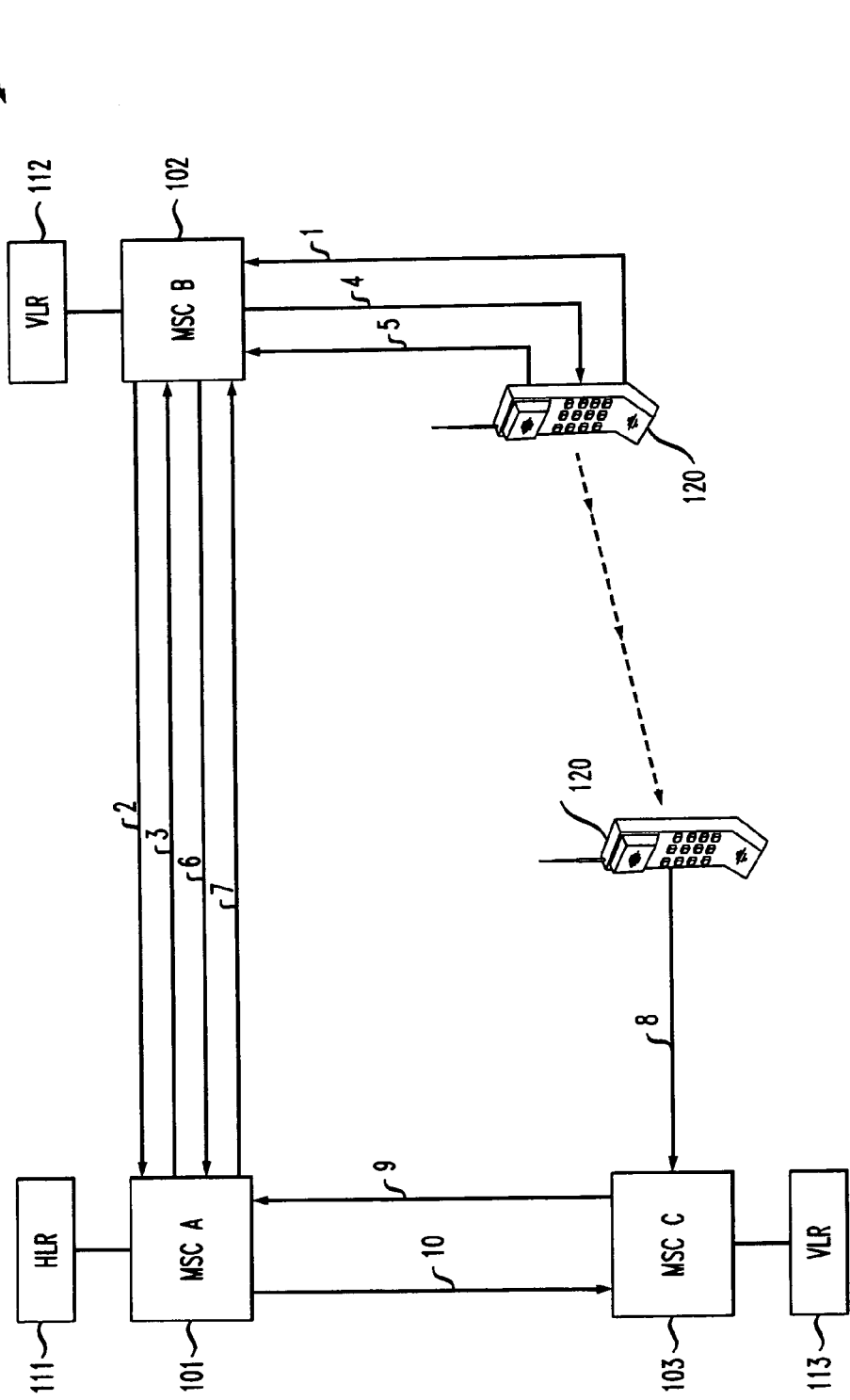
FIG. 1 illustrates in block diagram form the present message waiting notification update system and a typical environment in which it operates, including the exchange of messages among the various elements in the cellular communication network.

FIG. 1 illustrates in block diagram form the present message waiting notification update system and a typical environment in which it operates, including the exchange of messages among the various elements in the cellular communication network. A cellular communication network 100 consists of a plurality of Mobile Switching Centers 101–103, each of which serves one or more base station subsystems (not shown) that provide the radio frequency links to the plurality of mobile subscriber stations 120 that are operational in each call coverage area (termed cell) provided by the associated base station subsystem. One Mobile Switching Center 101 is typically termed the subscriber's home Mobile Switching Center and it maintains the subscriber's identification, authentication and call services definition data in an associated Home Location Register 111. Other Mobile Switching Centers 102, 103 maintain their own Home Location Registers (not shown) and Visited Location Registers 112, 113 to store call authorization data for subscribers who roam out of their home service area to the call coverage area of the visited Mobile Switching Centers 102, 103. Alternatively, the Home Location Register could be a Standalone Home Location Register SHLR thus not part of a Mobile Switching Center.

Initial Roaming Mobile Subscriber Station Registration with Notification

Figure 2A:
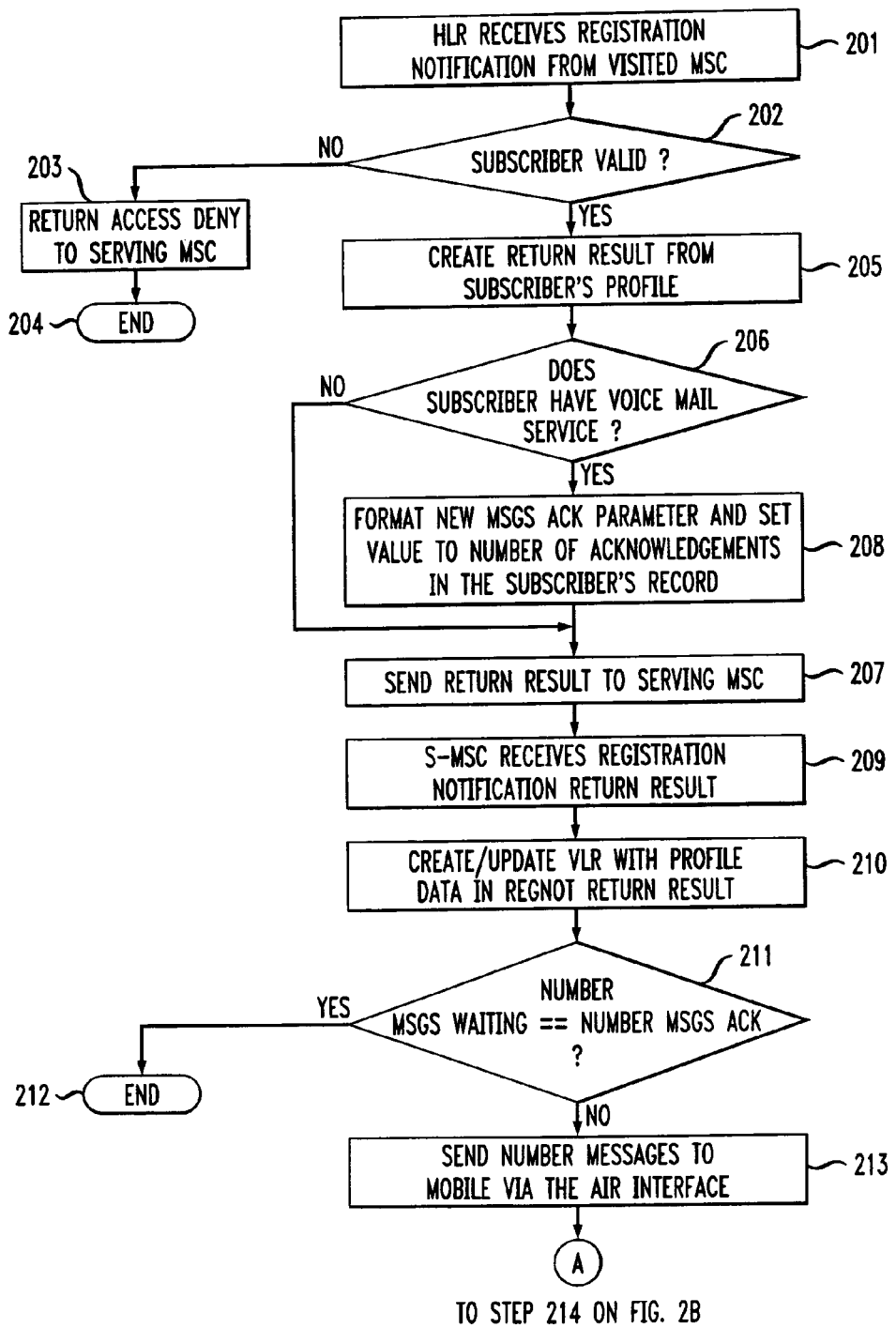
FIGS. 2A & 2B illustrate in flow diagram form the operation of the present message waiting notification update system to provide message waiting notification during an initial mobile subscriber station registration.
Figure 2B:
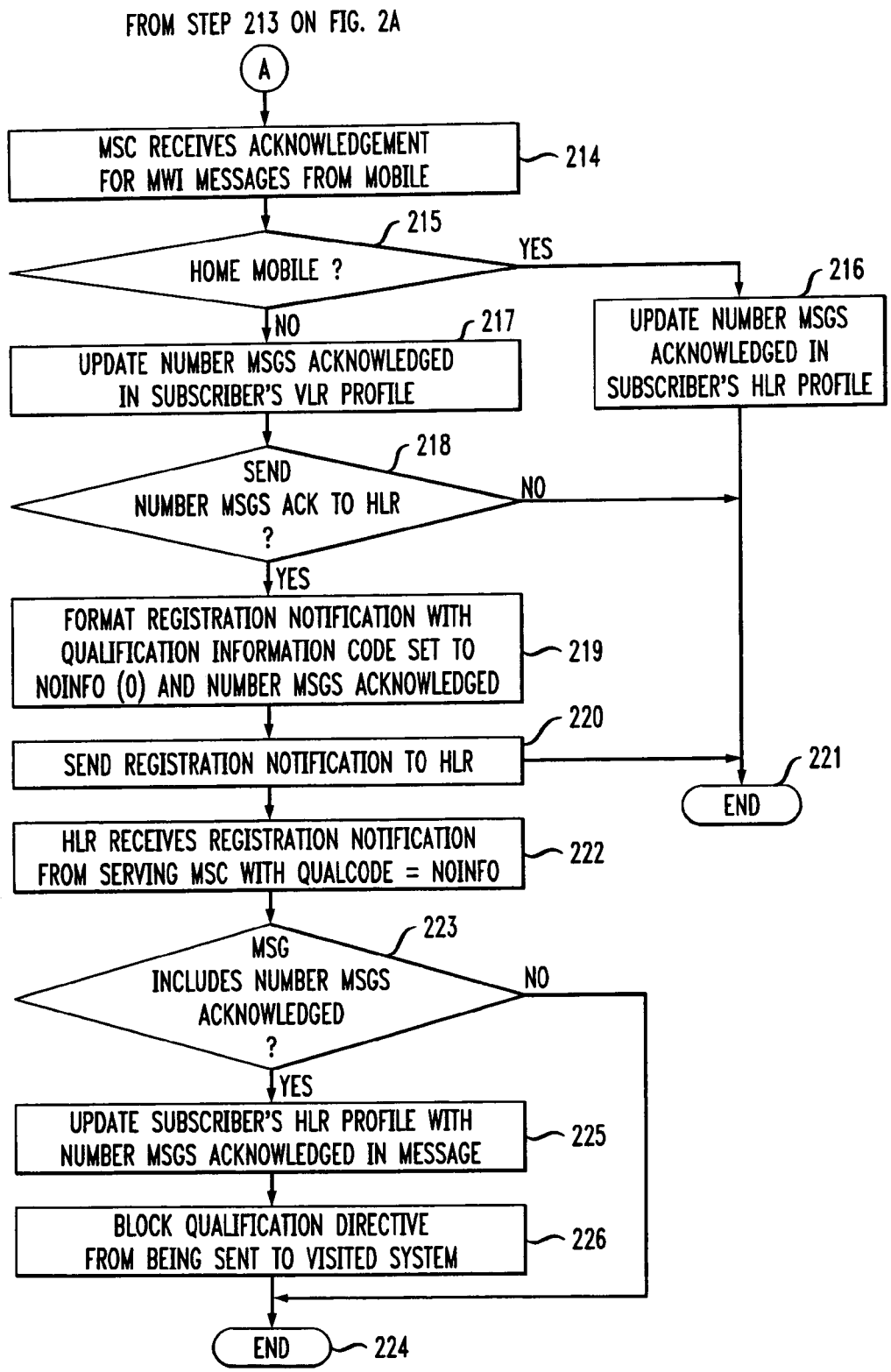

As illustrated in flow diagram form in FIGS. 2A and 2B, in the cellular communication network 100, when a mobile subscriber station 120 registers with a visited (serving) Mobile Switching Center 102 by transmitting a service request and the MIN/ESN of the mobile subscriber station 120 to the serving Mobile Switching Center 102 via path 1, the serving Mobile Switching Center 102 must validate the subscriber's authorization to receive service. This is accomplished at step 201 by transmitting a Registration Notification message to the subscriber's home Mobile Switching Center 101 over path 2 to retrieve data from the subscriber's Home Location Register (HLR) 111. The subscriber's Home Location Register (HLR) 111 at step 202 determines whether the identified mobile subscriber station 120 is a valid subscriber and if not, returns an Access Deny message to the serving Mobile Switching Center 102 at step 203 via path 3, the service request from mobile subscriber station 120 is denied and the process ends at step 204.

If the identified mobile subscriber station 120 is a valid subscriber, the Home Location Register (HLR) 111 creates a Registration Notification Return Result message that contains the necessary subscriber service authorization data at step 205 and determines at step 206 whether the subscriber has voice mail service. If the subscriber does not have voice mail service, processing advances to step 207, as described below. If the subscriber does have voice mail service, at step 208 the Home Location Register 111 retrieves data from its memory indicative of the number of unread messages that are stored in memory for the subscriber and also formats a new MSGS ACK parameter and sets the value to the number of these unread messages that have been previously acknowledged by the mobile subscriber station 120. For the purpose of this example, assume that new messages have arrived for the subscriber and no notification has previously been transmitted to the mobile subscriber station 120 to alert the subscriber of the presence of these unread messages. Then, at step 207 the Home Location Register 111 inserts this data into the previously generated Registration Notification Return Result message and transmits this message over path 3 to the serving Mobile Switching Center 102 indicative of the number of messages waiting for retrieval by the subscriber at the mobile subscriber station 120. The serving Mobile Switching Center 102 receives the Registration Notification Return Result message at step 209 and at step 210 creates or updates the Visited Location Register 112 with the subscriber profile data contained in the Registration Notification Return Result message and processes the service request for the mobile subscriber station 120 in well known fashion. At step 211, the serving Mobile Switching Center 102 compares the message waiting information contained in the Registration Notification Return Result message with the message waiting data stored in the Visited Location Register 112 for this subscriber. If the number of unread messages and acknowledgements identified by the subscriber's Home Location Register 111 matches the data stored in the Visited Location Register 112 for the number of unread messages acknowledged by the mobile subscriber station 120, processing ends at step 212. If the serving Mobile Switching Center 102 determines the presence of unacknowledged unread messages, then at step 213 the serving Mobile Switching Center 102 uses the forward control (paging) channel of the radio link (path 4) to the mobile subscriber station 120 to transmit this message waiting data to the mobile subscriber station 120. The mobile subscriber station 120 at step 214 acknowledges receipt of the message received on the forward control channel via path 5 and the presence of the unread message waiting information.

If the serving Mobile Switching Center is the subscriber's home location as determined at step 215, then at step 216, the subscriber's Home Location Register is updated to reflect the new number of unread messages acknowledged and processing ends at step 221. In the present case, the subscriber is roaming and at step 217 the Visited Location Register 112 in the serving Mobile Switching Center 102 is updated to indicate that the mobile subscriber station 120 has been notified about the presence of unread messages. At step 218, the serving Mobile Switching Center 102 determines whether the message acknowledgement data should be updated in the subscriber's Home Location Register 111. If no update is necessary, processing exits at step 221. If an update is required, at step 219 the serving Mobile Switching Center 102 generates a Registration Notification message with the qualification information code contained therein set to NOINFO(0) and containing data indicative of the number of messages acknowledged by the mobile subscriber station 120. At step 220, the serving Mobile Switching Center 102 transmits this message over path 6 to the subscriber's Home Location Register 111 via the subscriber's home Mobile Switching Center 101. The serving Mobile Switching Center 102 then terminates processing at step 221.

The subscriber's Home Location Register 111 receives the Registration Notification message at step 222 and at step 223 determines whether the message contains data indicative of the number of unread messages acknowledged by the mobile subscriber station 120. If this data is not contained in this message, processing exits at step 224, otherwise at step 225, the subscriber's Home Location Register 111 updates the subscriber's profile to reflect the new number of unread messages acknowledged by the mobile subscriber station 120. The subscriber's Home Location Register 111 then blocks the Qualification Directive message (as described below) from being transmitted to the serving Mobile Switching Center 102 and processing exits at step 224.

Thus, the message waiting notification update system maintains an accurate count of the number of unread messages waiting for a subscriber and the number of unread messages acknowledged by the mobile subscriber station. The serving Mobile Switching Center, upon receipt of a message waiting acknowledgement from the mobile subscriber station, updates the local copy of the subscriber's data in the Visited Location Register and forwards this information to the subscriber's Home Location Register where this received data is stored in the subscriber's Home Location Register entry for use when the next successive Registration Notification is received from a new serving Mobile Switching Center or in response to the subscriber initiating a local access.

Subsequent Roaming Mobile Subscriber Station Registrations Notification

In the case where the mobile subscriber station 120 roams to a new Mobile Switching Center 103, as illustrated by the dotted line in FIG. 1, the mobile subscriber station registration process is initiated at the new Mobile Switching Center 103 over path 8 and this becomes the serving Mobile Switching Center 103. The registration process is implemented as described above over paths 8 and 9 and the unread message and message acknowledgement data from the subscriber's profile in the Home Location Register 111 is written into a new entry in the Visited Location Register 113 for the purpose of this description, assume that the subscriber has not read the unread messages described above. If no new messages have arrived for the subscriber since the previous registration, then at step 211 the number of messages previously acknowledged matches the number of unread messages queued for the subscriber and the message waiting notification process exits at step 212. If new messages have arrived for the subscriber since the previous registration, then at step 214, data indicative of the updated number of unread messages is transmitted to the mobile subscriber station 120 and processing proceeds as described above.

Thus, the new registration process does not result in use of the forward control (paging) channel of the radio link to the mobile subscriber station 120 to transmit message waiting data indication to the mobile subscriber station 120, unless a data update is required. The serving Mobile Switching Center does not have to transmit a message waiting notification over the forward control channel to the mobile subscriber station, thereby conserving this resource.

Qualification Directive Notification

Figure 3A:
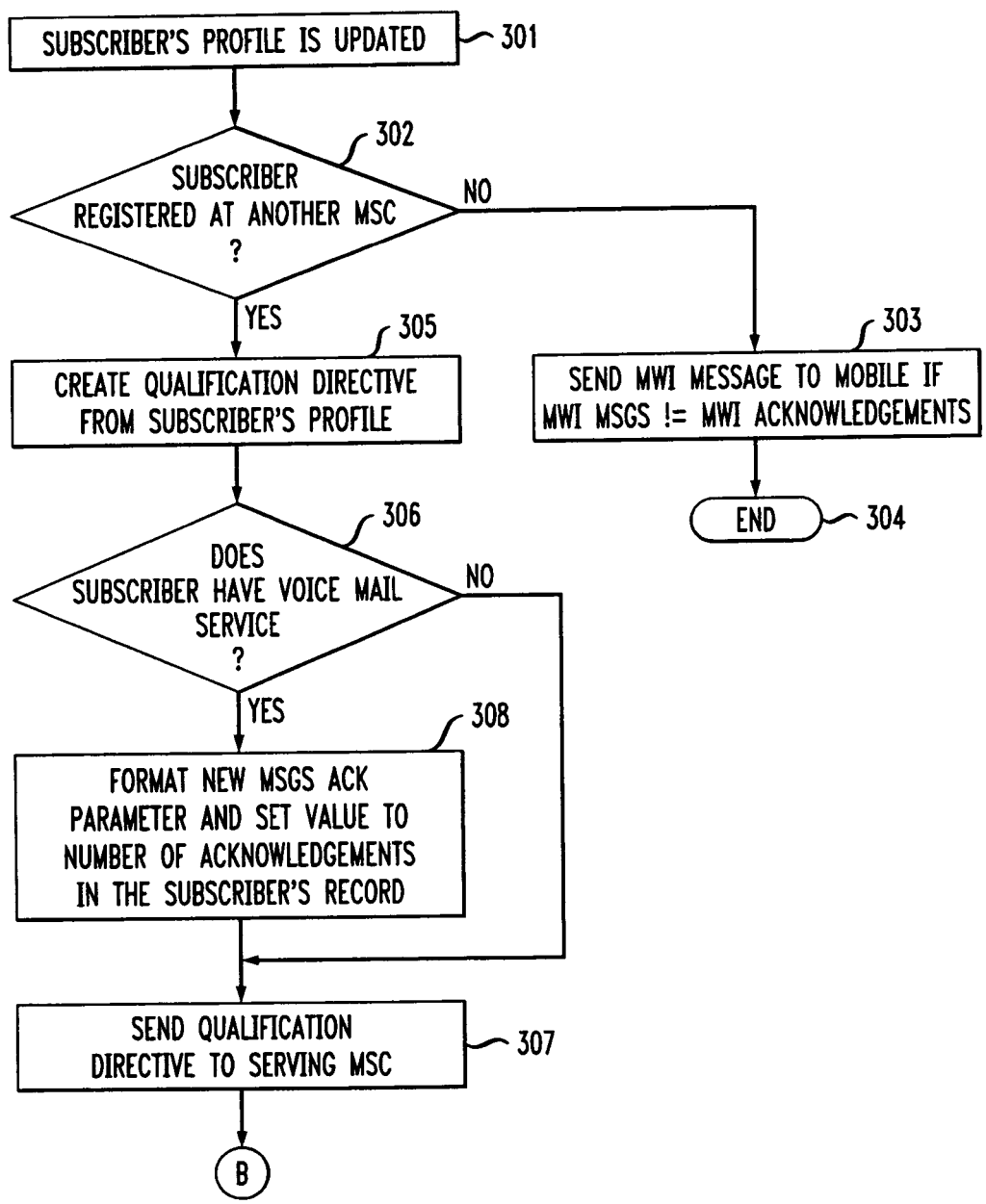
FIGS. 3A and 3B illustrate in flow diagram form the operation of the present message waiting notification update system to provide subscriber profile updates to the Visited Location Register in the serving Mobile Switching Center.
Figure 3B:
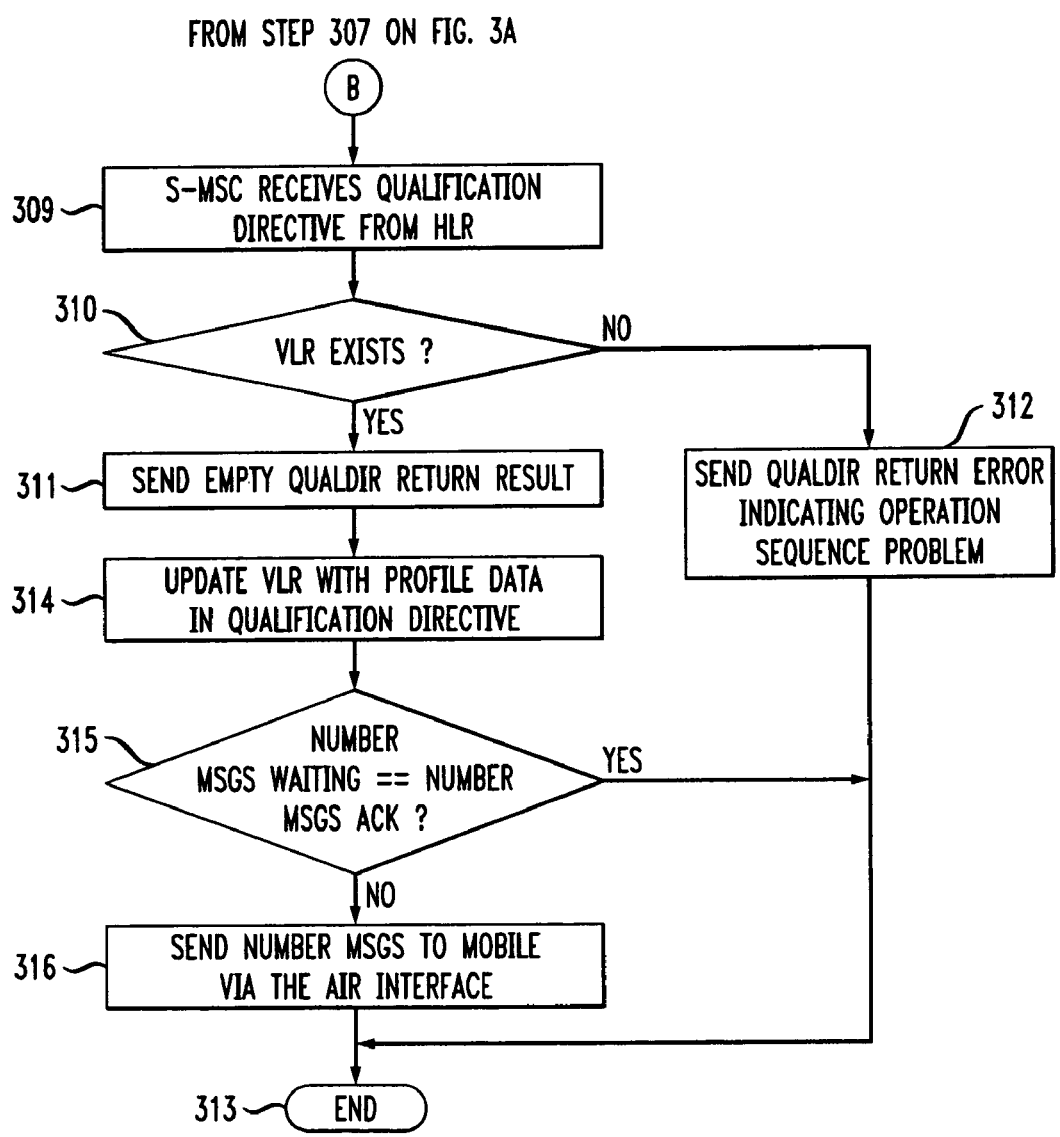

When the subscriber's Home Location Register 111 is updated and there is a serving Mobile Switching Center 102 that is providing service to the mobile subscriber station 120, the updated data written into the subscriber's Home Location Register 111 is propagated to the Visited Location Register 112. FIGS. 3A and 3B illustrate in flow diagram form the operation of the present message waiting notification update system to provide subscriber profile updates to the Visited Location Register in the serving Mobile Switching Center.

The process is initiated at step 301 when the subscriber's Home Location Register 111 updates a subscriber's profile. This could be either by a subscriber using a feature code to change a feature, personnel change the subscribers data, or an external entity, such as a voice mail system, initiate a change to the subscriber's data. At step 302, the subscriber's Home Location Register 111 determines whether the subscriber is registered at another Mobile Switching Center, for example, the serving Mobile Switching Center 102. If the subscriber is not registered at another Mobile Switching Center, at step 303, the subscribers home Mobile Switching Center 101 reviews the message waiting information stored in subscriber's profile in the Home Location Register 111. If the number of unread messages and acknowledgements identified by the subscriber's Home Location Register 111 matches, processing ends at step 304. If the number of unread messages and acknowledgements identified by the subscriber's Home Location Register 111 fail to match, the subscriber's home Mobile Switching Center 101 transmits message waiting data to the mobile subscriber station 120 using the forward control (paging) channel of the radio link as described above. The mobile subscriber station 120 acknowledges receipt of the message received on the forward control channel and the presence of the unread message waiting information and processing exits at step 304.

If the subscriber is registered at another Mobile Switching Center, for example the serving Mobile Switching Center 102, then at step 305, the subscriber's home Mobile Switching Center 101 creates a Qualification Directive message from the data stored in the subscriber's profile in the subscriber's Home Location Register 111. At step 306, the subscriber's home Mobile Switching Center 101 determines whether the subscriber has voice mail service. If the subscriber does not have voice mail service, processing advances to step 307, as described below. If the subscriber does have voice mail service, at step 308 the Home Location Register 111 retrieves data from its memory indicative of the number of unread messages that are stored in memory for the subscriber and also formats a new MSGS ACK parameter and sets the value to the number of these unread messages that have been previously acknowledged by the mobile subscriber station 120. For the purpose of this example, assume that new messages have arrived for the subscriber and no notification has previously been transmitted to the mobile subscriber station 120 to alert the subscriber of the presence of these unread messages. Then, at step 307 the Home Location Register 111 inserts this data into the previously generated Qualification Directive message and transmits this message to the serving Mobile Switching Center 102 indicative of the number of messages waiting for retrieval by the subscriber at the mobile subscriber station 120. The serving Mobile Switching Center 102 receives the Qualification Directive message at step 309 and at step 310 determines whether there is a profile data entry for this subscriber. If there is no profile data entry for this subscriber, the serving Mobile Switching Center 102 at step 312 transmits a Qualification Directive Return Error message to the subscriber's Home Location Register 111 and processing in the serving Mobile Switching Center 102 exits at step 313. If there is profile data entry for this subscriber, the serving Mobile Switching Center 102 at step 311 transmits an empty Qualification Directive Return Result message to the subscriber's Home Location Register 111 and at step 314 updates the Visited Location Register 112 with the subscriber profile data contained in the Qualification Directive message. At step 315, the serving Mobile Switching Center 102 compares the message waiting information contained in the Qualification Directive message with the message waiting data stored in the Visited Location Register 112 for this subscriber. If the number of unread messages and acknowledgements identified by the subscriber's Home Location Register 111 matches the data stored in the Visited Location Register 112 for the number of unread messages acknowledged by the mobile subscriber station 120, processing ends at step 313. If the serving Mobile Switching Center 102 determines the presence of unacknowledged unread messages, then at step 316 the serving Mobile Switching Center 102 uses the forward control (paging)

channel of the radio link to the mobile subscriber station 120 to transmit this message waiting data to the mobile subscriber station 120. The mobile subscriber station 120 acknowledges receipt of the message received on the forward control channel and the presence of the unread message waiting information. The processing of this transaction at the serving Mobile Switching Center 102 then exits at step 313.

Registration Cancellation

Figure 4A:
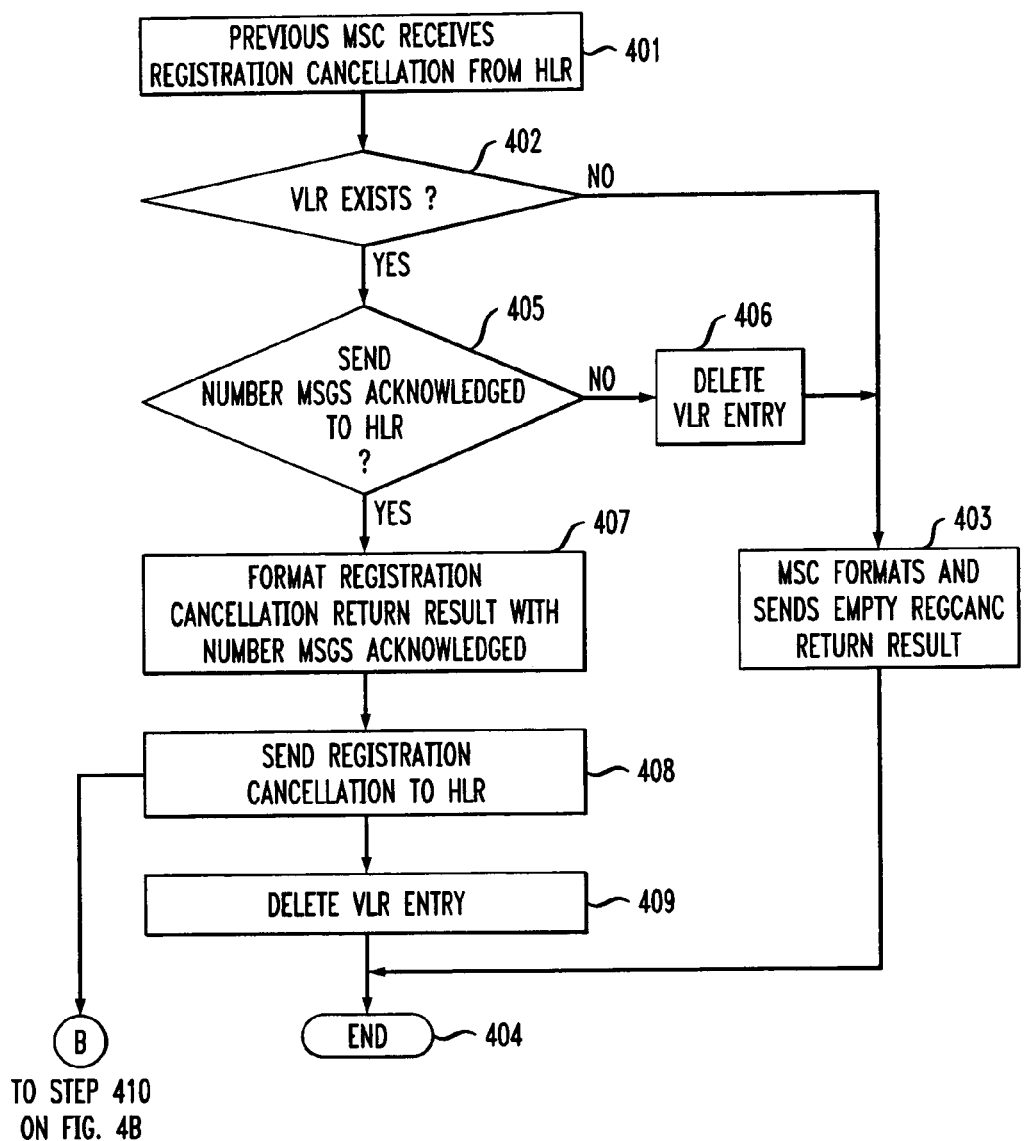
FIGS. 4A and 4B illustrate in flow diagram form the operation of the present message waiting notification update system in response to a Registration Cancellation process.
Figure 4B:
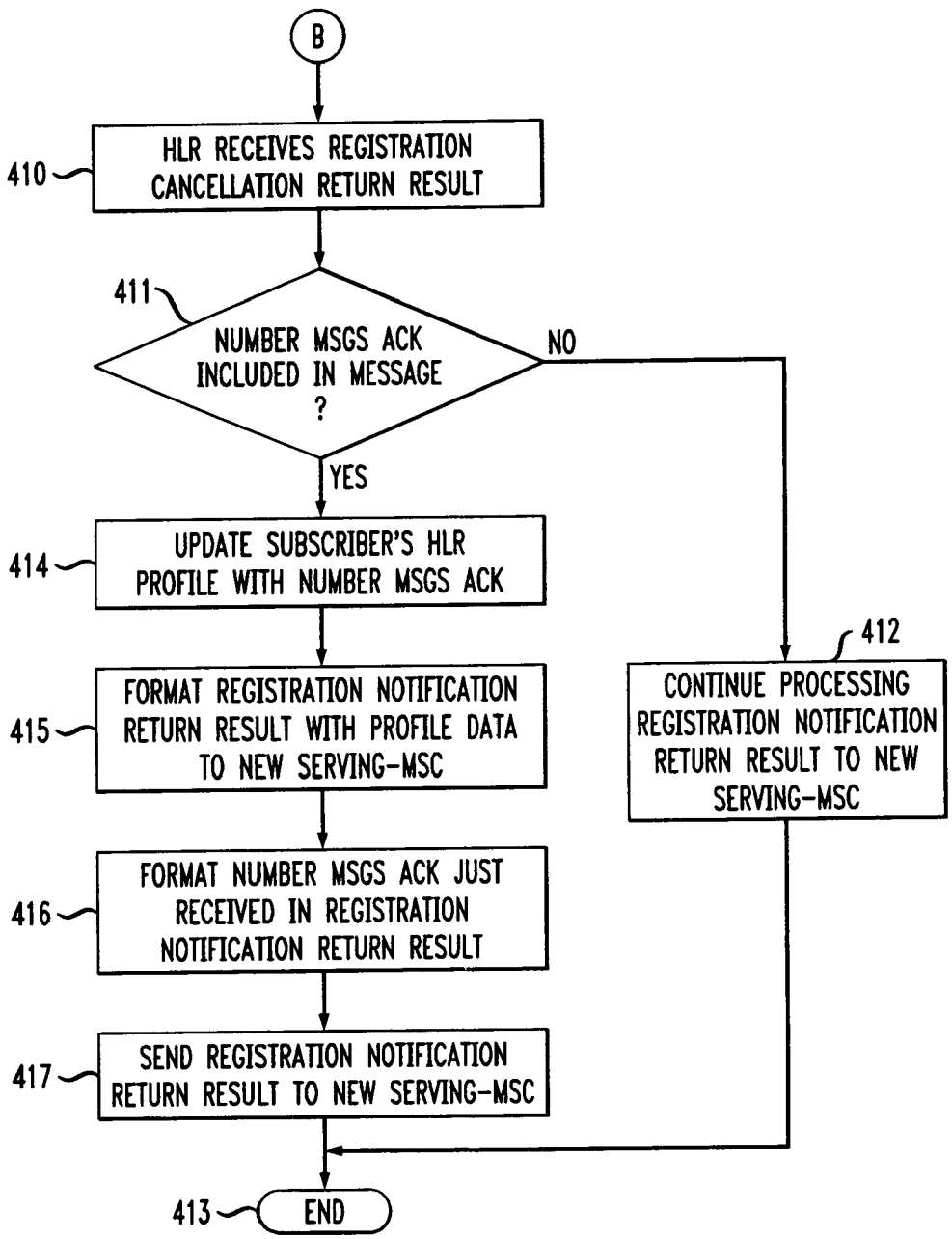

FIGS. 4A and 4B illustrate in flow diagram form the operation of the present message waiting notification update system in response to a Registration Cancellation process. In the case where the mobile subscriber station 120 roams from serving Mobile Switching Center 102 to a new Mobile Switching Center 103, as illustrated by the dotted line in FIG. 1, the mobile subscriber station registration process is initiated at the new Mobile Switching Center 103 and this becomes the serving Mobile Switching Center 103. The registration process is implemented as described above.

To ensure that there is only one Mobile Switching Center that is presently active as the serving Mobile Switching Center, the subscribers Home Location Register 111 cancels the subscribers profile entry that was stored in the Visited Location Register 112 in the previous serving Mobile Switching Center 102. This process is initiated at step 401 when the subscriber's Home Location Register 111 transmits a Registration Cancellation message to the previous serving Mobile Switching Center 102, identifying the subscriber as now being active at a new serving Mobile Switching Center 103. At step 402, the previous serving Mobile Switching Center 102 determines whether there is a profile data entry for this subscriber. If there is no profile data entry for this subscriber, the previous serving Mobile Switching Center 102 at step 403 transmits an empty Registration Cancellation message to the subscriber's Home Location Register 111 and processing in the serving Mobile Switching Center 102 exits at step 404. If there is a profile data entry for this subscriber, the previous serving Mobile Switching Center 102 at step 405 determines whether there is a need to transmit updated data to the subscriber's Home Location Register (HLR) 111 relating to the number of unread messages acknowledged by the mobile subscriber station 120. If not, the previous serving Mobile Switching Center 102 deletes the profile data entry for this subscriber and processing in the serving Mobile Switching Center 102 exits at step 404. If there is a need to transmit updated data to the subscriber's Home Location Register (HLR) 111 relating to the number of unread messages acknowledged by the mobile subscriber station 120, at step 407 the previous serving Mobile Switching Center 102 formats a Registration Cancellation Return Result message, containing data indicative of the number of unread messages acknowledged by the mobile subscriber station 120. The previous serving Mobile Switching Center 102 at step 408 transmits this message to the subscribers Home Location Register 111 via the subscriber's home Mobile Switching Center 101, deletes the profile data entry for this subscriber at step 409 and processing in the serving Mobile Switching Center 102 exits at step 404. The subscriber's Home Location Register 111 at step 410 receives the Registration Cancellation Return Result message and at step 411 determines whether the message contains data indicative of the number of unread messages acknowledged by the mobile subscriber station 120. If not, processing advances to step 412 where the subscriber's Home Location Register 111 processes the Registration Notification Return Result message, as described above at step 207, shown in FIG. 2. If the Registration Cancellation Return Result message contains data indicative of the number of unread messages acknowledged by the mobile subscriber station 120, at step 414, the subscriber's profile data in the Home Location Register 111 is updated with the number of unread messages acknowledged by the mobile subscriber station 120 and at step 415, the Home Location Register 111 formats a Registration Notification Return Result message with the subscriber's profile data stored in the Home Location Register 111 for this subscriber. At step 416, the Home Location Register 111 inserts data indicative of the number of acknowledgements identified by the previous serving Mobile Switching Center 102 into the previously generated Registration Notification Return Result message and transmits this message to the new serving Mobile Switching Center 103 at step 417. The processing at the Home Location Register 111 exits at step 413.

SUMMARY

The message waiting notification update system is operable in the serving Mobile Switching Center to maintain an accurate count of the number of unread messages waiting for a subscriber and the number of unread messages acknowledged by the mobile subscriber station. When the serving Mobile Switching Center receives a Registration Notification message return result from the subscriber's Home Location Register and the message waiting notification count is the same as the count previously sent to the Home Location Register, the serving Mobile Switching Center does not have to transmit a message waiting notification over the forward control channel to the mobile subscriber station.

The invention claimed is:

1. A message waiting notification update system, operable in a cellular communication network, for maintaining a count of the unread messages stored for a subscriber who uses a mobile subscriber station, comprising:

Home Location Register means, associated with said subscriber's home Mobile Switching Center, for maintaining a profile for said subscriber comprising a set of data that identifies said subscriber, a present count of unread messages for said subscriber, and data indicative of a present count of acknowledged unread messages for said subscriber;

registration means, operable in a serving Mobile Switching Center and responsive to said subscriber initiating a registration process from a mobile subscriber station at said serving Mobile Switching Center, for transmitting a registration request message to said Home Location Register means, associated with said subscriber's home Mobile Switching Center;

registration notification result means for transmitting said data indicative of a present count of unread messages for said subscriber, and said data indicative of a present count of acknowledged unread messages for said subscriber to said serving Mobile Switching Center; and message notification means, operable in a serving Mobile Switching Center and only responsive to the presence of unread messages in excess of those identified in said present count of acknowledged unread messages for said subscriber, for transmitting data to said subscriber indicative of a present count of unread messages for said subscriber.

2. The message waiting notification update system of claim 1 further comprising:

register update means for storing said data indicative of a present count of unread messages for said subscriber, and said data indicative of a present count of acknowledged unread messages for said subscriber in a visited location register associated with said saving Mobile Switching Center.

3. The message waiting notification update system of claim 2 further comprising:

registration cancellation means, responsive to said registration means, operable in said serving Mobile Switching Center, initiating said registration process and another Mobile Switching Center having said subscriber profile in a visited location register associated with said another Mobile Switching Center, for transmitting a registration cancellation message to said another Mobile Switching Center to remove said subscriber profile from said visited location register associated with said another Mobile Switching Center.

4. The message waiting notification update system of claim 3 further comprising:

registration update means, responsive to said registration cancellation message, for transmitting a message to said Home Location Register means, associated with said subscriber's home Mobile Switching Center indicative of a present count of acknowledged unread messages for said subscriber; and register update means operable in said subscriber's home Mobile Switching Center for updating said data indicative of a present count of acknowledged unread messages for said subscriber in said Home Location Register means.

5. The message waiting notification update system of claim 1 further comprising:

registration update means, operable in a serving Mobile Switching Center and responsive to said mobile subscriber station acknowledging receipt of said data indicative of a present count of unread messages for said subscriber, for transmitting a message to said Home Location Register means, associated with said subscriber's home Mobile Switching Center acknowledging receipt by said mobile subscriber station of said data indicative of a present count of unread messages for said subscriber; and register update means operable in said subscriber's home Mobile Switching Center for updating said data indicative of a present count of acknowledged unread messages for said subscriber in said Home Location Register means.

6. The message waiting notification update system of claim 1 further comprising:

Home Location Register update means, responsive to a change in said data indicative of a present count of unread messages for said subscriber, for transmitting said data indicative of a present count of unread messages for said subscriber, and said data indicative of a present count of acknowledged unread messages for said subscriber to said serving Mobile Switching Center.

7. The message waiting notification update system of claim 6 further comprising:

register update means for storing said data indicative of a present count of unread messages for said subscriber, and said data indicative of a present count of acknowledged unread messages for said subscriber in a visited location register associated with said serving Mobile Switching Center.

8. A method of providing a message waiting notification update, operable in a cellular communication network, for maintaining a count of the unread messages stored for a subscriber who uses a mobile subscriber station, comprising:

maintaining in a Home Location Register, associated with said subscriber's home Mobile Switching Center, a profile for said subscriber comprising a set of data that identifies said subscriber, service authorizations for said subscriber, said data indicative of a present count of unread messages for said subscriber, and data indicative of a present count of acknowledged unread messages for said subscriber;

transmitting, from a serving Mobile Switching Center and in response to said subscriber initiating a registration process from a mobile subscriber station at said serving Mobile Switching Center, a registration request message to said Home Location Register, associated with said subscriber's home Mobile Switching Center;

transmitting registration notification data indicative of a present count of unread messages for said subscriber, and said data indicative of a present count of acknowledged unread messages for said subscriber to said serving Mobile Switching Center; and transmitting, from a serving Mobile Switching Center and only in response to the presence of unread messages in excess of those identified in said present count of acknowledged unread messages for said subscriber, message notification data to said subscriber indicative of a present count of unread messages for said subscriber.

9. The method of providing a message waiting notification update of claim 8 further comprising:

storing register update data indicative of a present count of unread messages for said subscriber, and said data indicative of a present count of acknowledged unread messages for said subscriber in a visited location register associated with said serving Mobile Switching Center.

10. The method of providing a message waiting notification update of claim 9 further comprising:

transmitting, in response to said registration process and another Mobile Switching Center having said subscriber profile in a visited location register associated with said another Mobile Switching Center, a registration cancellation message to said another Mobile Switching Center to remove said subscriber profile from said visited location register associated with said another Mobile Switching Center.

11. The method of providing a message waiting notification update of claim 10 further comprising:

transmitting, in response to said registration cancellation message, a registration update message to said Home Location Register, associated with said subscriber's home Mobile Switching Center, indicative of a present count of acknowledged unread messages for said subscriber; and updating in said subscriber's home Mobile Switching Center said data indicative of a present count of acknowledged unread messages for said subscriber in said Home Location Register.

12. The method of providing a message waiting notification update of claim 8 wherein said step of message notification comprises:
   transmitting, from a serving Mobile Switching Center and in response to said data indicative of a present count of unread messages for said subscriber, and said data indicative of a present count of acknowledged unread messages for said subscriber indicating the presence of unread messages in excess of those identified in said present count of acknowledged unread messages for said subscriber, registration data to said mobile subscriber station indicative of a present count of unread messages for said subscriber.

13. The method of providing a message waiting notification update of claim 12 further comprising:
   transmitting, in response to said mobile subscriber station acknowledging receipt of said data indicative of a present count of unread messages for said subscriber, a registration update message to said Home Location Register, associated with said subscriber's home Mobile Switching Center acknowledging receipt by said mobile subscriber station of said data indicative of a present count of unread messages for said subscriber; and
   updating said data indicative of a present count of acknowledged unread messages for said subscriber in said Home Location Register.

14. The method of providing a message waiting notification update of claim 8 further comprising:
   transmitting, in response to a change in said data indicative of a present count of unread messages for said subscriber, said Home Location Register update data indicative of a present count of unread messages for said subscriber, and said data indicative of a present count of acknowledged unread messages for said subscriber to said saving Mobile Switching Center.

15. The method of providing a message waiting notification update of claim 14 further comprising:
   storing said register update data indicative of a present count of unread messages for said subscriber, and said data indicative of a present count of acknowledged unread messages for said subscriber in a visited location register associated with said serving Mobile Switching Center.

16. The method of providing a message waiting notification update of claim 15 wherein said message notification means comprises:
   transmitting, from a serving Mobile Switching Center and responsive to said data indicative of a present count of unread messages for said subscriber, and said data indicative of a present count of acknowledged unread messages for said subscriber indicating the presence of unread messages in excess of those identified in said present count of acknowledged unread messages for said subscriber, registration data to said mobile subscriber station indicative of a present count of unread messages for said subscriber.

17. The method of providing a message waiting notification update of claim 16, further comprising:
   registration update means, responsive to said mobile subscriber station acknowledging receipt of said data indicative of a present count of unread messages for said subscriber, for transmitting a message to said Home Location Register, associated with said subscriber's home Mobile Switching Center acknowledging receipt by said mobile subscriber station of said data indicative of a present count of unread messages for said subscriber; and
   updating, in said subscriber's home Mobile Switching Center, said register update data indicative of a present count of acknowledged unread messages for said subscriber in said Home Location Register.

* * * * *